(12) United States Patent
Chabloz (10) Patent No.: US 11,738,610 B2
(45) Date of Patent: Aug. 29, 2023

(54) TIRE PATCH DETECTION (71) Applicant: Melexis Technologies SA, Bevaix (CH)

(72) Inventor: Jeremie Chabloz, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 111 days.

(21) Appl. No.: 16/942,193

(22) Filed: Jul. 29, 2020

(65) Prior Publication Data
US 2021/0031574 A1 Feb. 4, 2021

(30) Foreign Application Priority Data

Jul. 31, 2019 (EP) .................................. 19189499

(51) Int. Cl.
B60C 23/06 (2006.01)
B60C 23/04 (2006.01)
B60T 8/172 (2006.01)

(52) U.S. Cl.
CPC ........ *B60C 23/064* (2013.01); *B60C 23/0493* (2013.01); *B60T 8/1725* (2013.01); *B60T 2240/03* (2013.01)

(58) Field of Classification Search
CPC ............ B60C 23/0435; B60C 23/0416; B60C 23/0489; B60C 23/0488; B60C 23/0415; B60C 23/0447; B60C 23/0494; B60C 23/062; B60C 23/0457; B60C 23/0459; B60C 23/0466; B60C 23/0471;
(Continued)

(56) References Cited

U.S. PATENT DOCUMENTS 6,801,872 B2 10/2004 Normann et al.
8,424,375 B2 * 4/2013 Pannek .................. B60T 8/1725
73/146.5
(Continued)

FOREIGN PATENT DOCUMENTS

CN 103153656 A 6/2013
CN 106042792 A 10/2016
(Continued)

OTHER PUBLICATIONS

Search Report and Written Opinion from corresponding EP Application No. 19189499.7, dated Dec. 16, 2019.
(Continued)

*Primary Examiner* — Harshad R Patel
*Assistant Examiner* — Gedeon M Kidanu
(74) *Attorney, Agent, or Firm* — Workman Nydegger (57) ABSTRACT A detection system for extracting information from a sensor module in a rolling wheel comprises: a sensor module which comprises a sensor adapted for sensing a physical property of the tire when mounted in a tire of the wheel or on an inner surface of a tire of the wheel; an acquisition module adapted for sampling a signal from the sensor module, thus obtaining a sequence of data samples; a correlation module adapted for cross-correlating a signed reference sequence with the sequence of data samples thus obtaining a correlation sequence; an extraction module adapted for identifying at least one perturbation in the correlation sequence, wherein the perturbation is induced when a part of the tire where the sensor is mounted hits the ground thereby forming the tire patch.

19 Claims, 8 Drawing Sheets (58) Field of Classification Search
CPC . B60C 23/0486; B60C 23/0408; B60C 23/20;
B60C 23/0493; B60C 11/24; B60C
23/0401; B60C 23/0433; B60C 11/246;
B60C 23/001; B60C 23/003; B60C
23/007; B60C 23/008; B60C 23/009;
B60C 23/02; B60C 23/041; B60C
23/0413; B60C 23/0423; B60C 23/0461;
B60C 23/0496; B60C 23/0498; B60C
23/061; B60G 2800/984; B60T 2240/06;
B60T 2240/07; B60T 2240/08; E01F
9/696; F16D 2066/001; G01L 17/00;
G01L 17/005; G01L 19/0092; G01L
19/08; G01L 19/083; G01L 19/086; G01L
5/28; G01L 7/166; G01B 11/22; G01B
2210/50; G01B 5/18; G01M 17/02;
G01M 17/027; G01M 17/013; G02F 1/31;
G02F 2203/12; H02S 10/12; H02S 20/21;
H02S 20/22
See application file for complete search history.

(56) References Cited

U.S. PATENT DOCUMENTS

| | | | |
|---|---|---|---|
| 8,844,346 B1 * | 9/2014 | Singh | B60C 23/064 73/146 |
| 9,459,275 B2 | 10/2016 | Guinart | |
| 10,099,519 B2 | 10/2018 | Lemense et al. | |
| 10,328,755 B2 | 6/2019 | Tebano et al. | |
| 10,549,587 B2 | 2/2020 | Kollmitzer et al. | |
| 2003/0042890 A1 | 3/2003 | Normann et al. | |
| 2010/0294032 A1 | 11/2010 | Pannek et al. | |
| 2013/0179113 A1 | 7/2013 | Guinart | |
| 2014/0007683 A1 | 1/2014 | Guinart et al. | |
| 2016/0288596 A1 | 10/2016 | Lemense et al. | |
| 2017/0102293 A1 * | 4/2017 | Singh | B60W 40/12 |
| 2017/0106706 A1 * | 4/2017 | Bettecken | B60C 23/0488 |
| 2018/0079262 A1 | 3/2018 | Masago | |
| 2018/0244116 A1 * | 8/2018 | Zhuk | B60C 23/0416 |
| 2019/0118591 A1 | 4/2019 | Kollmitzer et al. | |
| 2019/0118592 A1 * | 4/2019 | Kollmitzer | B60C 23/064 |

FOREIGN PATENT DOCUMENTS

| | | | |
|---|---|---|---|
| CN | 109677213 A | 4/2019 | |
| CN | 109677214 A | 4/2019 | |
| DE | 102007039242 A1 | 2/2009 | |
| DE | 102018201463 A1 * | 8/2019 | |
| EP | 1795881 A1 | 6/2007 | |
| EP | 1795881 B1 * | 6/2009 | B60C 23/064 |
| GB | 2510434 A | 8/2014 | |
| WO | 0169265 A1 | 9/2001 | |

OTHER PUBLICATIONS

Office Action from corresponding Chinese Application No. 202010751050.9, dated May 19, 2022.

* cited by examiner

TIRE PATCH DETECTION

FIELD OF THE INVENTION

The invention relates to the field of sensor devices mountable in a tire of a vehicle. More specifically it relates to detection systems and methods which are adapted for extracting information from a sensor module in a tire or on an inner surface thereof.

BACKGROUND OF THE INVENTION

Figure 1:
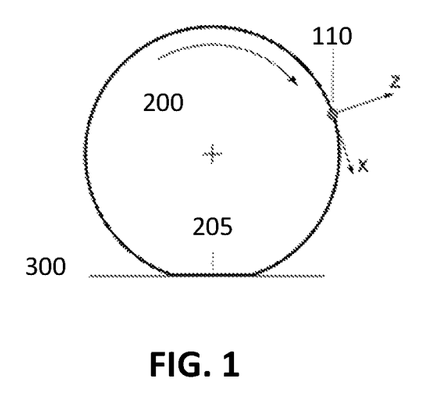
FIG. 1 shows a schematic drawing of a tire in which a sensor is mounted.

Tire mounted sensors are mounted inside a tire or on an inner surface thereof. An example of a tire 200 in which a sensor 110 is mounted is schematically illustrated in FIG. 1. The sensor is mounted at a certain position of the tire 200. The time period during which this position is part of the contact patch 205 or is neighbouring the contact patch 205 between the tire 200 and the road surface 300 a perturbation will occur in the signal generated by the tire mounted sensor.

This perturbation may reveal several properties of the tire such as for example the load on the wheel on which the tire is mounted, and the rotation speed of the tire. However, noise on the signal from the sensor may significantly complicate extraction of information from the sensor signal.

There is therefore a need for systems and methods which are adapted for extracting information from a sensor module in a rolling wheel.

SUMMARY OF THE INVENTION

It is an object of embodiments of the present invention to provide good systems and methods for extracting information from a sensor module in a rolling wheel.

The above objective is accomplished by a method and device according to the present invention.

In a first aspect embodiments of the present invention relate to a detection system for extracting information from a sensor module in a rolling wheel. The detection system comprises:

a sensor module which comprises a sensor adapted for sensing a physical property of the tire when mounted in a tire of the wheel or on an inner surface of a tire of the wheel, an acquisition module adapted for sampling a signal from the sensor module, thus obtaining a sequence of data samples, a correlation module adapted for cross-correlating a signed reference sequence with the sequence of data samples thus obtaining a correlation sequence, an extraction module adapted for identifying at least one perturbation in the correlation sequence, wherein the perturbation is induced when a part of the tire where the sensor is mounted hits the ground thereby forming the tire patch.

It is an advantage of detection systems according to embodiments of the present invention that they are robust against noise. This is achieved by cross-correlating the sequence of data samples with the signed reference sequence. The signed reference sequence may for example be a signed step function.

It is an advantage of detection systems according to embodiments of the present invention that they are robust against residual oscillations.

Instead of directly processing the sampled data, in embodiments of the present invention, first the data is cross-correlated with a signed reference sequence. This is advantageous because the signal offset, which is present in the sampled data, is not present in the correlation sequence.

Hence, it is an advantage of embodiments of the present invention that it is simple to determine whether there is a feature of interest in the signal or not.

As only simple mathematical operations are required in a detection system according to embodiments of the present invention this will result in a reduced power consumption compared to detection systems which require more complex mathematical operations. Hence, a low power detection system can be obtained.

In embodiments of the present invention the extraction module is moreover adapted for obtaining at least one property of the rolling wheel from the at least one perturbation.

In embodiments of the present invention the signed reference sequence is a finite reference sequence of length 2N, wherein N is a natural number greater than 0.

In embodiments of the present invention the cross-correlation may for example be achieved as a sequence of additions and subtractions. For example by adding the first N samples and subtracting the following N samples. It is advantageous that this can be done using a simple low power processor. The obtained result may be normalized. It is, however, not required.

In embodiments of the present invention the correlation module is adapted for dynamically adjusting the length of the signed reference sequence.

In embodiments of the present invention the correlation module is adapted for normalizing the correlation sequence by dividing the elements thereof with an integer multiple of N.

In embodiments of the present invention the signed reference sequence is a signed step function which comprises a first sequence of data with a first sign and a second sequence of data with a second sign opposite to the first sign.

In embodiments of the present invention the absolute value of the samples of the reference sequence which are different from zero may be constant or may be varying (giving a different weight to the different data samples).

In embodiments of the present invention the one or more perturbations in the correlation sequence are identified by comparing the correlation sequence with a characterizing feature of the perturbation.

In embodiments of the present invention at least one predefined threshold is used as characterizing feature.

In embodiments of the present positive and/or a negative thresholds may be used as features.

In embodiments of the present invention at least one property of the rolling wheel is the number of samples in the one or more perturbations.

In embodiments of the present invention at least one property of the rolling wheel is the amplitude of the one or more perturbations.

In embodiments of the present invention at least one property of the rolling wheel is the duration of the one or more perturbations.

This duration may for example be expressed in time or in number of samples.

In embodiments of the present invention the detection system moreover comprises a communication module adapted for transmitting the one or more perturbations or a processed version thereof.

In embodiments of the present invention the sensor is an acceleration sensor.

The acceleration sensor may for example be a tangential acceleration sensor or a normal acceleration sensor.

In embodiments of the present invention the extraction module is adapted for obtaining a measure for a load on the rolling wheel.

In a second aspect embodiments of the present invention relate to a method for extracting information from a sensor module in a rolling wheel. The method comprises:

sensing a physical property of the tire when mounted in a tire of the wheel or on an inner surface of a tire, sampling a signal from the sensor module, thus obtaining a sequence of data samples, cross-correlating a signed reference sequence with the sequence of data samples thus obtaining a correlation sequence, identifying at least one perturbation in the correlation sequence, wherein the perturbation is induced when a part of the tire where the sensor is mounted hits the ground thereby forming a tire patch.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a detection system 190 for extracting information from a sensor module in a rolling wheel.

Figure 3:
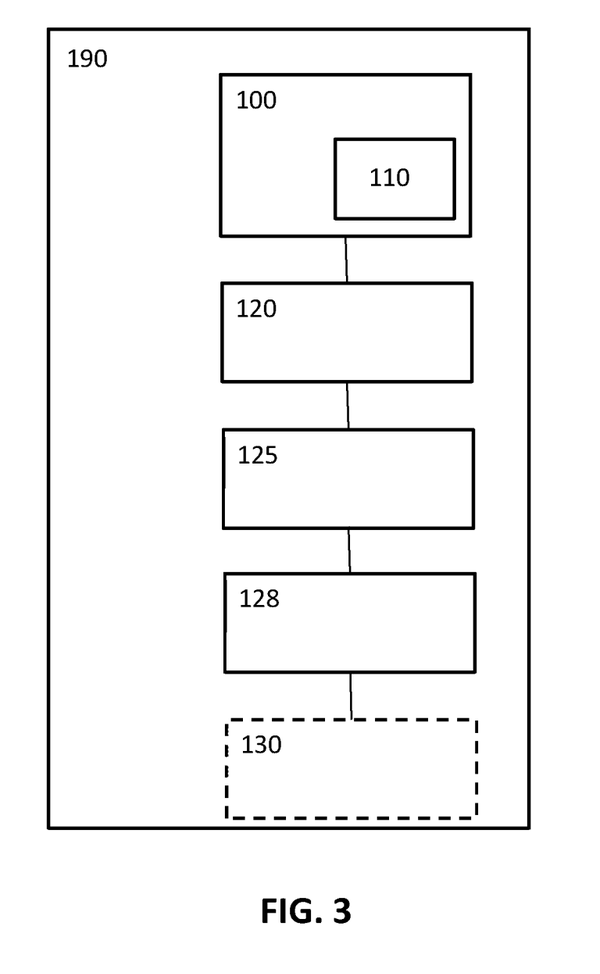
FIG. 3 shows a schematic drawing of a detection system in accordance with embodiments of the present invention.

A schematic drawing comprising different modules of such a detection system is illustrated in FIG. 3. A detection system 190 in accordance with embodiments of the present invention comprises a sensor module 100 which comprises a sensor 110 adapted for sensing a physical property of the tire when mounted in a tire of the wheel or on an inner surface of a tire.

Figure 2:
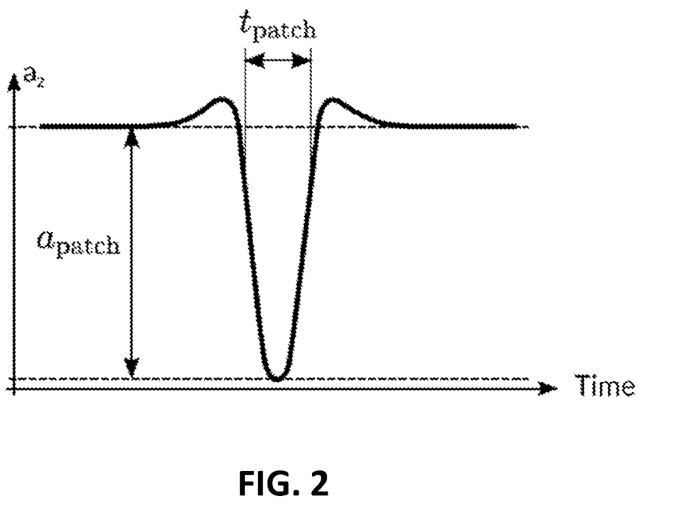
FIG. 2 shows a diagram of a contact patch induced perturbation on the normal acceleration signal in function of time.

When such a sensor module 100 is mounted inside the tire, it will rotate together with the tire. The contact between the tire and the ground results in a deformation of the tire. This deformation results in an additional change of the physical property of the tire which is measured by the sensor 110. Hence, a perturbation will be present in the data from the sensor. This perturbation is induced by the contact patch nearby the sensor. Acquiring the sensor data during this contact patch period is also referred to as contact patch acquisition. An example of such a perturbation is shown in FIG. 2. It shows the perturbation generated by an acceleration sensor adapted for measuring the normal acceleration signal (along the Z-axis in FIG. 1). The amplitude of the perturbation is shown in function of time. The perturbation has a falling edge from a first maximum to a minimum and a rising edge from the minimum to a second maximum. The duration between a threshold crossing of the falling edge and a threshold crossing of the rising edge is equal to $t_{patch}$. The invention is, however, not limited thereto. In some embodiments the duration between the first maximum and the second maximum is equal to $t_{patch}$. In all cases it should be a measure for the width of the pulse. The depth of the perturbation $a_{patch}$ is, in this example, measured as the difference between the minimum and the value of the signal outside the perturbation. In another example it may be the difference between the maximum and the minimum of the perturbation. The useful information is mainly present in the perturbation.

The detection system 190, moreover, comprises an acquisition module 120 adapted for sampling a signal from the sensor module, thus obtaining a sequence of data samples. In embodiments of the present invention the acquisition of the data may be performed using an analog to digital converter (ADC). This ADC converts an analog signal from the sensor into digitized data. The sampling rate may for example be comprised between 1 kHz and 20 kHz, for example between 5 kHz and 15 kHz.

The detection system 190, moreover, comprises a correlation module 125 adapted for cross-correlating a simple signed reference sequence such as a signed step function with the sequence of data samples thus obtaining a correlation sequence. The signed reference sequence comprises a first sequence of data with a first sign and a second sequence of data with a second sign opposite to the first sign. The absolute value of the data may be constant. The data may be multiplied with a weighing factor different from one. The weighing factor may be constant, or it may vary depending on the data index. Cross-correlating the signed reference sequence with the sequence of data samples may be implemented either in software or in hardware.

The detection system 190, moreover, comprises an extraction module 128 which is adapted to identify at least one perturbation in the correlation sequence, wherein the perturbation is induced when a part of the tire where the sensor is mounted hits the ground thereby forming the tire patch. From this at least one perturbation one or more properties of the rolling wheel may be derived. This identification can be done by comparing the correlation sequence with at least one characterizing feature (also referred to as patch signature) of the perturbation. The at least one characterizing feature may be predefined or it may be adapted in function of the speed of the tire. In embodiments of the present invention the at least one characterizing feature of the perturbation comprises leading edge and/or trailing edge conditions of the perturbation. Other features of the perturbation, such as for example a peak, may be used for recognizing the perturbation in the correlation sequence.

In embodiments of the present invention the extraction module 128 may be adapted for obtaining at least one property of the rolling wheel from the correlation sequence. For example the patch width and/or depth may be obtained.

In embodiments of the present invention the sensor module 100 may for example comprise at least one sensor 110 which is an acceleration sensor. The acceleration sensor may be sensitive to an acceleration component normal to its trajectory (along the z-axis in FIG. 1) or tangential to its trajectory (along the x-axis in FIG. 1) or a combination of both. The acceleration encountered by the sensor in the vicinity of and at the contact of the so-called tire patch area. The patch area corresponds to the small portion of a tire at which it is contact with the road. At this position, by the combined effects of the tire own elasticity and the vertical forces exerted on it by the vehicle weight, the trajectory of a sensor attached to the tire deviates from a perfectly circular motion, thus resulting in variations of the sensor acceleration components. These variations can be used to detect the patch position and extract properties such as the patch width, height, etc. Ultimately, these properties can be used in various algorithms, used e.g. to calculate the load exerted on the tire by the vehicle. The invention is not limited to acceleration sensors. Also other sensors, measuring different physical properties, such as an ultrasonic sensor, a piezoelectric sensor, an optical sensor, a magnetic sensor, a deformation sensor, or a shock sensor may be used. The different sensors may, moreover, be combined.

Figure 6:
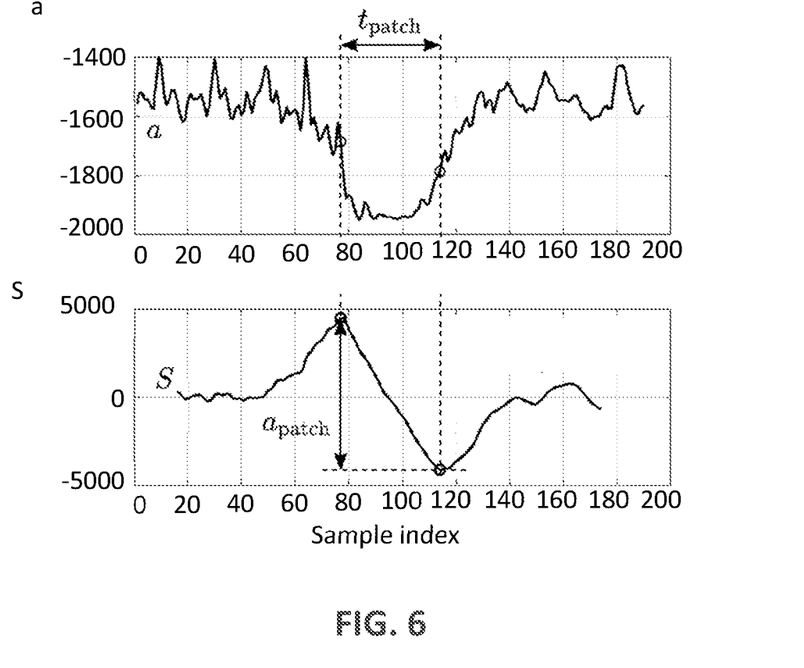
FIG. 6 shows the normal acceleration in function of the sample index and the signed-step correlation with the normal acceleration in function of the sample index, in accordance with embodiments of the present invention.

It is advantageous that the at least one perturbation and the at least one property of the wheel can be determined in a robust manner. The reason therefore is that the correlation sequence is processed in stead of directly processing the sequence of data samples. Robustness can be obtained against the following issues: offset, noise, residual oscillations. This is illustrated by FIG. 6 of which the top graph shows the normal acceleration in function of the sample index, and of which the bottom graph shows the signed-step correlation in function of the sample index, in accordance with embodiments of the present invention.

It is an advantage of embodiments of the present invention that an offset which may be present in the data samples of a sensor is not present in the correlation sequence. Such an offset would affect the choice for detection thresholds of the perturbation. In that case it could be required that these thresholds are adapted dynamically depending on the sensor offset or it could be required that the sensor performs an extra step of offset compensation.

Moreover, noise may be present on the data samples of the sensor which affects the accuracy of the threshold crossing instants. Filtering the signal (e.g. with a simple or exponential moving average) may attenuate both the signal feature to be detected (edge) and the noise at the same time.

Residual oscillations in the data signal of the sensor may result in several rapid consecutive threshold crossings. Such oscillations are customarily observed in tire normal acceleration signals (see for example the top graph of FIG. 6).

Simple low-pass filtering of the signal is not really suited to solve this problem since it would attenuate both the noise and the signal and at the same time add an extra phase shift to the signal. Obtaining the amplitude of the perturbation is, moreover, not obvious in the sequence of data samples shown in the top graph of FIG. 6, in view of the noisy signal.

To obtain the example of FIG. 6 the type of tire used was 225/45R17. The speed of the vehicle was 30 km/h, and the length of the signed step function was 2N with N=16. The invention is, however, not limited thereto and other parameters may be used. The patch width property and the patch depth property are obtained from the correlation sequence. In this example the patch width corresponds with the number of samples between the minimum and the maximum of the perturbation. It is equal to 37. In this example the patch depth corresponds with the difference between the maximum and the minimum of the cross-correlation during the perturbation. It is equal to 268.19. The setup used was a drum setup. In such a setup a large (in comparison with the wheel) circular drum is applied with a certain force against a tire mounted on a rim. By rotating the drum the motion of a tire against a (road) surface is replicated.

Figure 4:
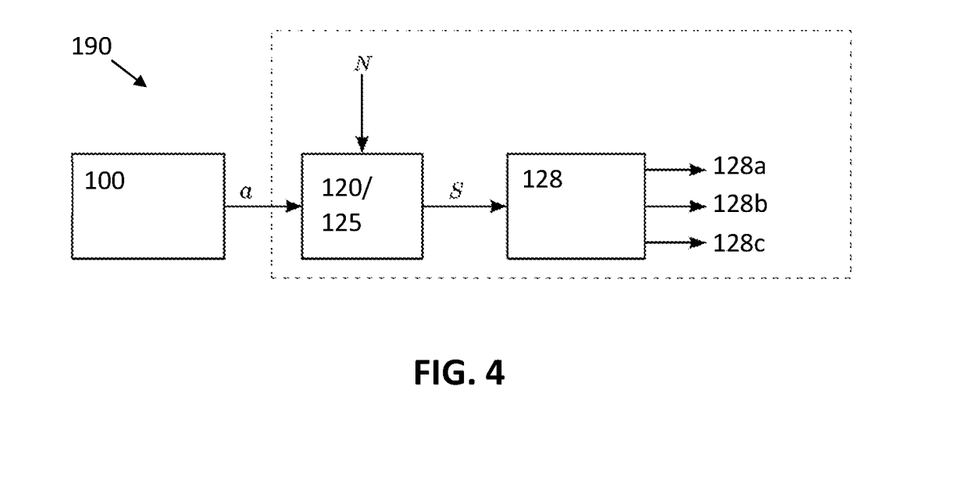
FIG. 4 shows an exemplary detection system in accordance with embodiments of the present invention which is adapted for detecting the presence of the perturbation and for obtaining a measure of the width of the perturbation and a measure of the amplitude of the perturbation.

An exemplary detection system 190, in accordance with embodiments of the present invention, is schematically drawn in FIG. 4. The detection system 190 comprises a sensor module 100. The sensor module can be mounted in a tire (it may be overmoulded) or on an inner surface thereof. It may for example comprise a normal acceleration sensor.

The data samples a of the sensor module 100 are used as input for the acquisition module 120. Using the consecutive measured data samples (e.g. normal acceleration samples), consecutive samples of a signed-step cross-correlation signal S(n) can be calculated. This is done by the correlation module 125. The extraction module 128 is adapted for identifying at least one perturbation in the correlation sequence. In this example the extraction module outputs whether or not a perturbation is detected 128*a*, the width of the perturbation 128*b*, and the amplitude of the perturbation 128*b*.

The equations below describe how the signed-step cross-correlation values S(n) may be calculated from the measured data samples a and the signed reference sequence y with parameter N, in accordance with an exemplary embodiment of the present invention.

$$S(n) = \frac{1}{2N} \sum_{m=0}^{2N-1} a(n+m-2N+1)y(m)$$

In this equation the function N is a natural number bigger than 0, and y is the step function. In embodiments of the present invention N may be equal to 1 or larger. In some embodiments of the present invention the minimum value of N is 2.

The step function y may for example be described with the following formula.

$$\text{sign}\left(\sum_{m=0}^{N-1} y(m)\right), \text{ is opposite to } \text{sign}\left(\sum_{m=N}^{2N} y(m)\right)$$

In some embodiments of the present invention the sign of y(m) for 0≤m<N is opposite to the sign of y(m) for N≤m<2N for those y(m) wherein y(m) is different from zero.

$$\text{sign}(y(m)) \text{ for } 0 \le m < N \text{ is opposite to sign}(y(m)), -1$$
$$\text{for } N \le m < 2N$$

In some embodiments of the present invention y=0 for one or more samples in the signed reference sequence y(m). The signed reference sequence y(m) may for example be different from zero for 0≤m≤N−k1 and for N+k2≤m<2N and equal to zero for N−k1<m<N+k2 with k1 and k2 natural numbers different from zero (they may for example be equal).

Figure 5:
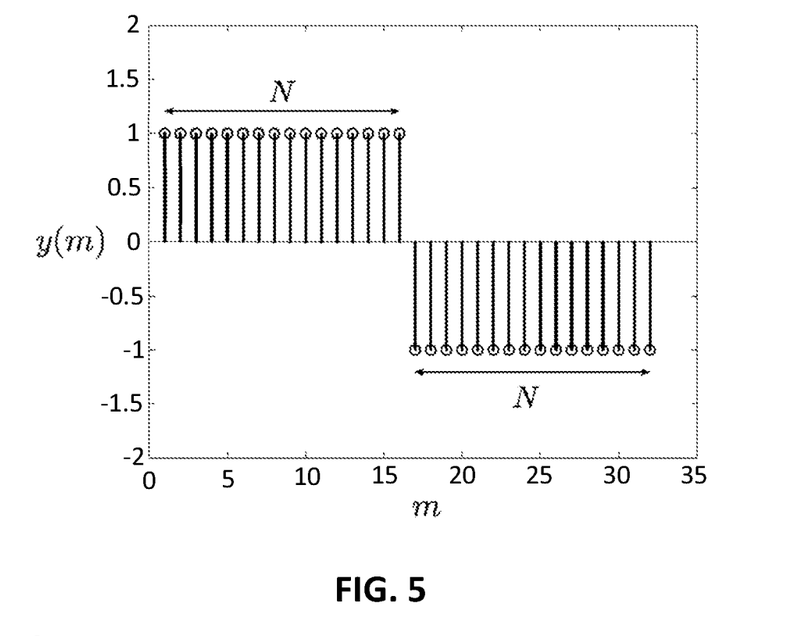
FIG. 5 shows a signed step function which can be cross-correlated with the sequence of data samples to obtain a correlation sequence in accordance with embodiments of the present invention.

In some embodiments of the present invention the absolute value of the samples of y(m) which are different from zero may be constant or may be varying (giving a different weight to the different data samples). In some embodiments of the present invention $\Sigma_{m=0}^{2N}y(m)=0$. In this example the step function is a finite signed-step sequence signal. The exemplary step function is shown in FIG. 5. A parameter N defines the length of the signed-step signal which is equal to 2N. The correlation sequence corresponds to the cross-correlation of the acceleration signal and the signed-step signal. Note that the correlation sequence can also be seen as the difference between two N-samples moving averages delayed in time by N samples. In embodiments of the present invention the correlation sequence signal may further normalized by a factor 2N.

The bottom graph of FIG. 6 shows the calculated correlation sequence out of the sequence of data samples (a measured normal acceleration signal) after re-aligning it in time with the sequence of data samples.

It is an advantage of embodiments of the present invention that the correlation sequence averages to 0 for a sequence of data samples in periods without perturbation, and this even if there is an offset in the sequence of data samples. This is illustrated in FIG. 6. Even though the raw data samples have an offset between −1400 and −1600 during the patch free period, the calculated correlation sequence averages to 0 during the patch free period.

In this example it is advantageous that the correlation sequence peaks to a maximum as a result of a falling edge in the sequence of data samples at the beginning of the contact patch (see for example FIG. 6). Similarly it is advantageous that the correlation sequence peaks to a minimum as a result of a rising edge in the sequence of data samples at the end of the contact patch. It is to be noted that if the signs of the signed step function are inverted, also the minimum and maximum are inverted for the falling versus rising edge detection.

In embodiments of the present invention the extraction module is adapted for determining at least one property of the rolling wheel. This property may be the presence or not of the contact patch. The presence of a contact patch is thereby determined if a perturbation is identified in the correlation sequence. The perturbation in the correlation sequence may be identified by comparing the correlation sequence with a characterizing feature of the perturbation. The presence or not of a perturbation in the signal can for example be extracted by detecting a falling and/or rising edge by comparing the correlation sequence signal with a pre-defined positive and/or respectively negative threshold.

In embodiments of the present invention the extraction module may be adapted for obtaining the perturbation width. A measure for the perturbation width can for example be obtained by measuring the number of samples between the maximum and the minimum in a perturbation of the correlation sequence. This width is indicated by $t_{patch}$ in FIG. 6. Any other property which is a measure of the width of the perturbation may be obtained from the perturbation.

Another property may be the amplitude of the perturbation in the correlation sequence also referred to as the patch depth. This can for example be obtained by making the difference between the maximum and the minimum of the perturbation in the correlation sequence. This amplitude is indicated by $a_{patch}$ in FIG. 6. Also other properties which are a measure of the depth of the perturbation may be obtained from the perturbation.

Figure 7:
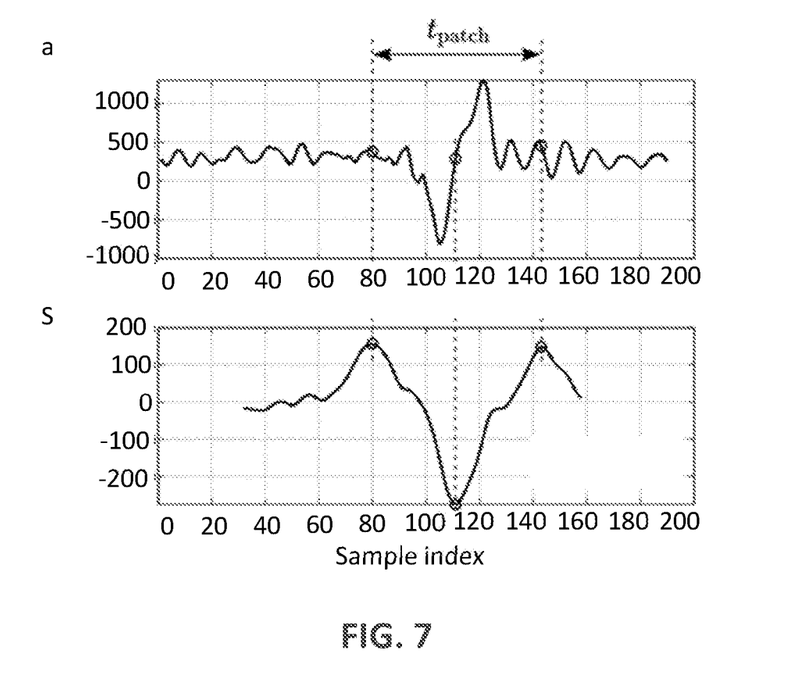
FIG. 7 shows the tangential acceleration in function of the sample index and the signed-step correlation with the tangential acceleration in function of the sample index, in accordance with embodiments of the present invention.

The top graph in FIG. 7 shows a sequence of data samples, and the bottom graph shows the cross-correlation of these data sample with a signed step function, wherein the data samples are obtained using an acceleration sensor which is adapted for measuring the tangential acceleration. In this example the time between two peaks of a perturbation in the correlation sequence is used as a measure of the patch duration. Also the time between the zero crossings in the correlation sequence may be used as a measure for the patch duration. The obtained patch duration is not necessarily exactly equal for a perturbation obtained using a tangential acceleration sensor and for a perturbation obtained using the normal acceleration. However, both are a measure of the patch width.

To obtain the example of FIG. 7 the type of tire used was a 225/45R17. The setup used was a drum setup. The speed of the vehicle was 75 km/h, and the length of the signed step function was 2N with N=32. The invention is, however, not limited thereto and other parameters may be used. The patch width property is obtained from the correlation sequence. In this example the patch width corresponds with the number of samples between the minimum and the maximum of the perturbation. It is equal to 63.

Figure 8:
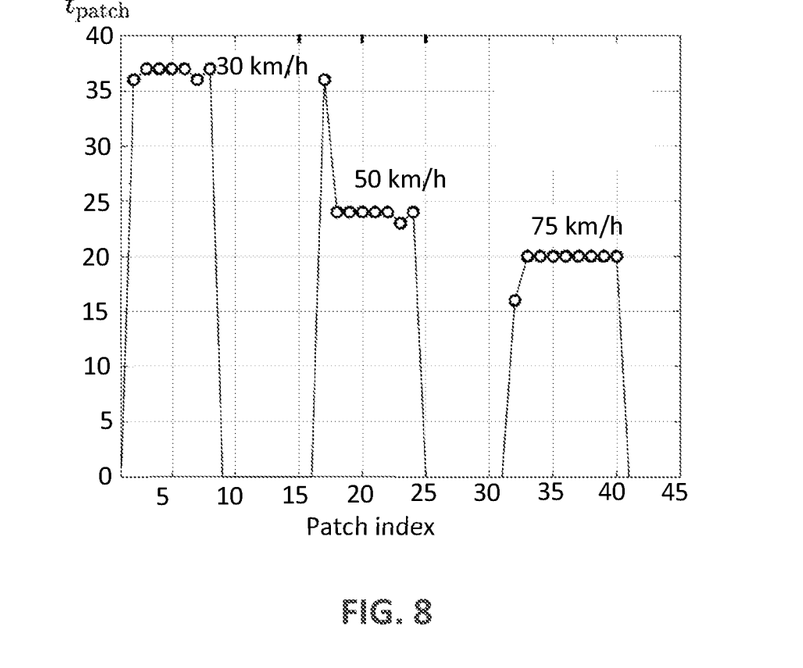
FIG. 8 shows the width of a perturbation in the correlation sequence for different speeds of the vehicle, in accordance with embodiments of the present invention.

In embodiments of the present invention the patch width property (also referred to as patch duration) may be used as a measure of the wheel speed. This is illustrated in FIG. 8. This figure shows the extracted patch width property ($t_{patch}$) for the same tire (type 225/45R17) measured at different speeds. The setup used was a drum setup. The length of the signed step function was 2N with N in this example equal to 16. It can be seen that the differences in the patch width can properly be distinguished. In general, the patch width becomes smaller for an increasing wheel speed.

Figure 9:
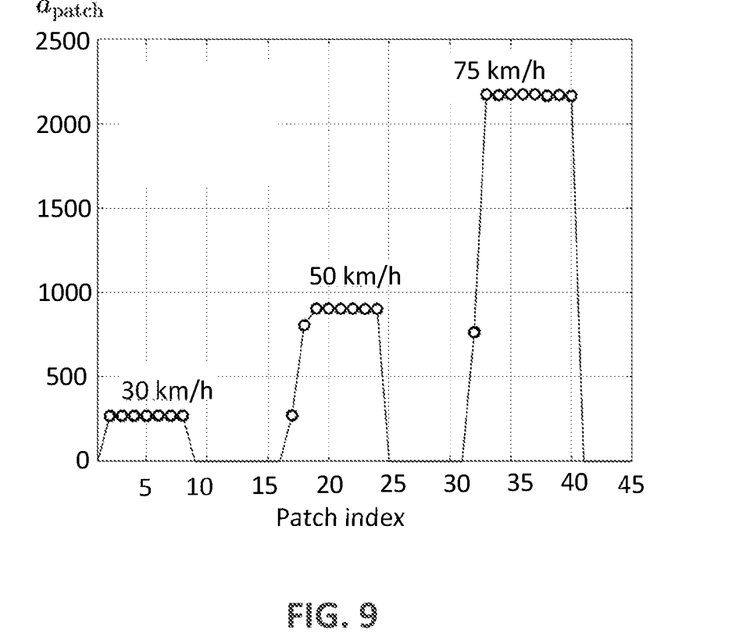
FIG. 9 shows the amplitude of a perturbation in the correlation sequence for different speeds of the vehicle, in accordance with embodiments of the present invention.

A measure of the contact patch depth or amplitude can be extracted by measuring the difference between the maximum value and the minimum value of the correlation sequence. An example of the contact patch depth, obtained using a detection sensor comprising a tangential acceleration sensor in accordance with embodiments of the present invention, in function the wheel speed is shown in FIG. 9. This figure shows the extracted patch depth property ($a_{patch}$) for the same tire (type 225/45R17) measured at different speeds. The setup used was a drum setup. It can be seen that the expected differences in the patch depth can properly be distinguished. The length of the signed step function was 2N with N in this example equal to 16. Contrary to the patch width (see FIG. 8), the patch depth increases with speed.

It is an advantage of embodiments of the present invention that the correlation sequence can be easily calculated requiring only addition and subtraction operations. Identifying the one or more perturbations can be done using comparison operations. In embodiments of the preset invention only a limited number of operations is required, for obtaining the at least one property of the rolling wheel.

Figure 10:
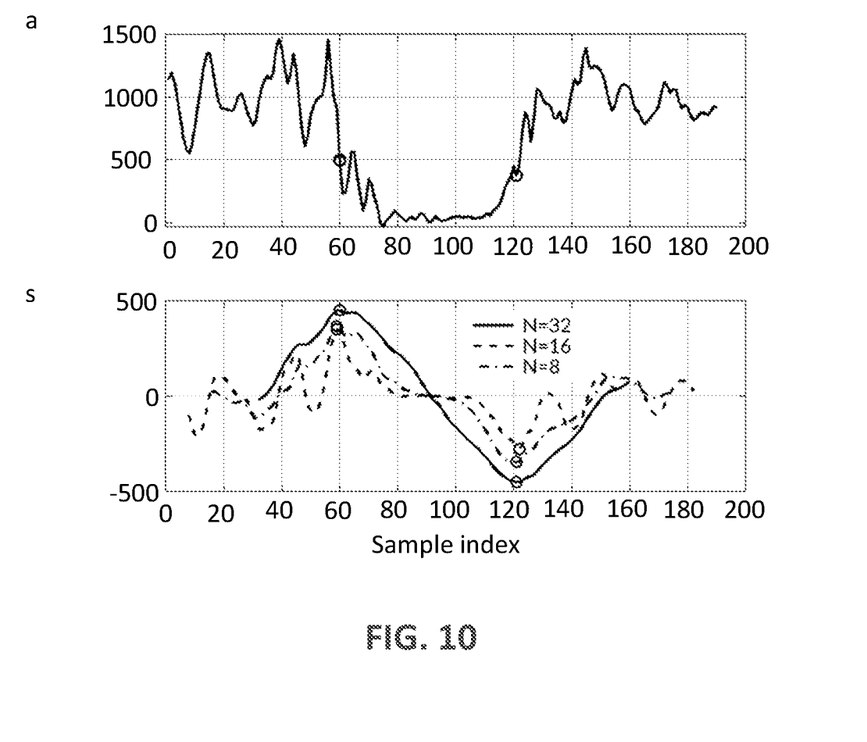
FIG. 10 illustrates the effect of the length of signed step function on the correlation sequence, wherein the correlation sequence is obtained using a method or system in accordance with embodiments of the present invention.

The signed step function may for example have a length of 2N, with N positive followed by N negative values or vice versa. The value of the parameter N can be chosen according to the following considerations:

If N is large, the correlation sequence will better filter out noise and oscillations un-related to the perturbation that needs to be extracted. This is illustrated by FIG. 10 of which the curves are obtained with a detection system in accordance with embodiments of the present invention, in a real road measurement experiment. With increasing N, the falling and rising edge of the contact patch can be more reliably extracted out of the computed correlation sequence.

The larger the value of N, the larger will be the buffer required to memorize data samples.

The larger the value of N, the larger will be the delay until useful features can be extracted out of the measured acceleration samples.

If N is larger than the minimum patch width of interest, it will start attenuating the peak value of the correlation sequence, making it more difficult the extraction of maximum and minimum values.

In embodiments of the present invention N may for example have a value between 8 and 64, N may for example be between 16 and 32.

In embodiments of the present invention the parameter N may be dynamically adapted (e.g. in function of the noise level, and the expected patch width) to improve the performance even further.

Figure 15:
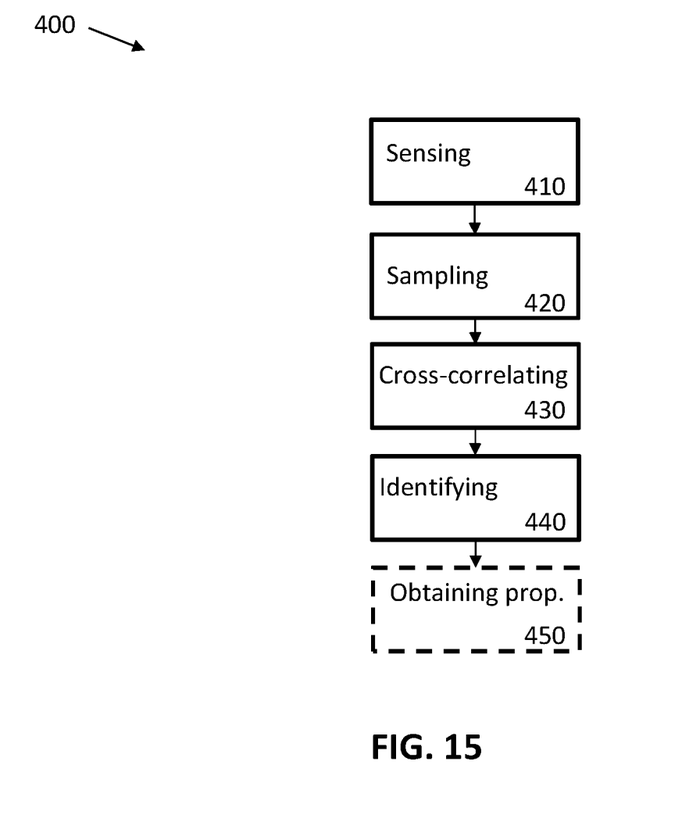
FIG. 15 shows a flow chart comprising different steps of a method in accordance with embodiments of the present invention.

In a second aspect embodiments of the present invention relate to a method for extracting information from a sensor module in a rolling wheel. The method comprises (see FIG. 15):

sensing 410 a physical property of the tire when mounted in a tire of the wheel or on an inner surface of a tire, sampling 420 a signal from the sensor module, thus obtaining a sequence of data samples, cross-correlating 430 a signed reference sequence with the sequence of data samples thus obtaining a correlation sequence, identifying 440 at least one perturbation in the correlation sequence, wherein the perturbation is induced when a part of the tire where the sensor is mounted hits the ground thereby forming a tire patch.

A method in accordance with embodiments of the present invention may, moreover, comprise a step obtaining 450 at least one property of the rolling wheel from the one or more perturbations. This may for example be the perturbation depth, the perturbation width, an estimate of the load, an estimate of the rotation speed of the wheel.

Figure 11:
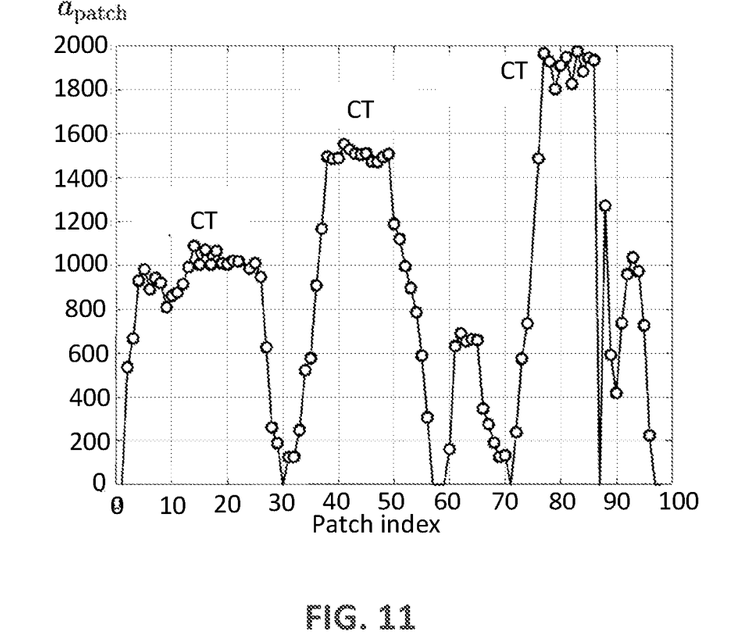
FIG. 11 shows the amplitude of a perturbation in the correlation sequence for different speeds of the vehicle on the road, measured with detection system in accordance with embodiments of the present invention.

To further illustrate the capabilities of a detection system and a method in accordance with embodiments of the present invention, FIG. 11 shows values of extracted patch depth out of measured acceleration values acquired during a test on the road. The extracted patch depth is a property obtained from the correlation sequence using a method or detection system in accordance with embodiments of the present invention.

It can be seen that the extracted patch depth can be used for example to extract a reliable indication of the wheel/vehicle speed. A detection system in accordance with embodiments of the present invention may be adapted for determining the wheel/vehicle speed as property of the rolling wheel from the correlation sequence. Acceleration and deceleration phases as well as periods of approximately constant speed (CT) can be clearly identified out of the extracted tire contact patch depth property.

Figure 12:
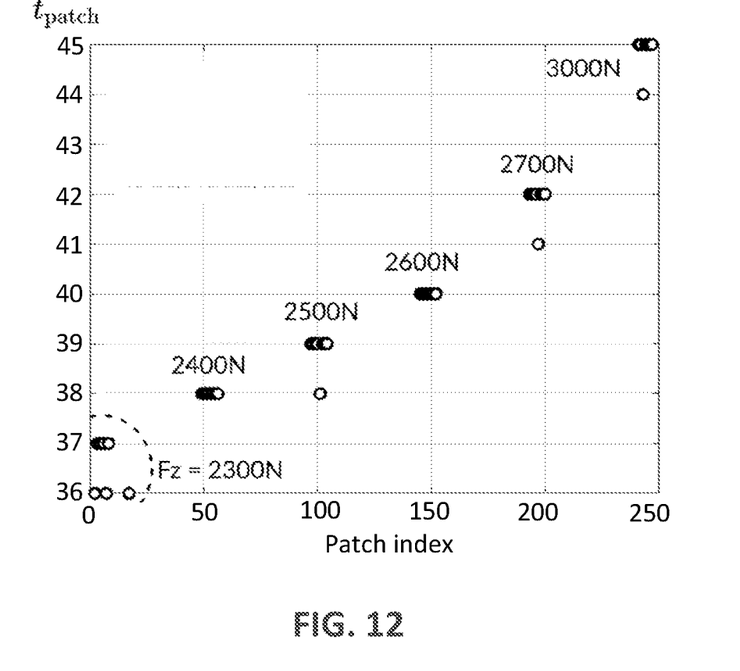
FIG. 12 shows the width of a perturbation in the correlation sequence for different vertical loads of the vehicle, in accordance with embodiments of the present invention.

A detection system 190 according to embodiments of the present invention may be adapted for detecting the load on the wheel as a property of the rolling wheel. FIG. 12 highlights the difference seen in the extracted patch width feature as the load (vertical force) increases. FIG. 12 shows the extracted perturbation width property out of measurements performed at 30 km/h. The type of tire used was 225/45R17, the used setup was a drum setup, and the length of the signed step function was 2N with N=16. Each group represents consecutive measurements with different vertical load applied on the tire. It can be seen that the estimated perturbation width can be used as a measure for the load. The conversion from perturbation width to vertical load may for example be obtained by calibration.

A detection system in accordance with embodiments of the present invention may be implemented centrally in one device (e.g. the sensor module and an integrated circuit embedded in the same package which may for example result in a reduced noise level) or its functionality may be distributed.

In embodiments of the present invention the correlation module and the extraction module may for example be implemented in digital hardware (HW) in a tire-mounted sensor device, or as a software (SW) application running on a processing device of the detection system.

In embodiments of the present invention the detection system may comprise a communication module 130 adapted for transmitting, the data samples, or the correlation sequences, or the one or more perturbations or a processed version thereof. This may be achieved through wireless transmission (e.g. Bluetooth Low Energy (BLE) or ultra-high frequency (UHF) proprietary protocol). The at least one perturbation may be processed before transmission in order to obtain a property of the rolling wheel. Alternatively, the sampled data or the correlation sequence, or the at least one perturbation may be transmitted and at least part of the extraction module 128 may be physically separated from the detection system. Processing of the sampled data or the correlation sequence, or the at least one perturbation may be implemented in hardware logic or as software on a processing module or a combination of hardware logic and software.

It is an advantage of embodiments of the present invention that contact patch features within data samples of a tire mounted sensor can be reliably detected. This is achieved by cross-correlating a signed reference sequence with the sequence of data samples thus obtaining a correlation sequence. In embodiments of the present invention, perturbations which are induced when a part of the tire where the sensor is mounted hits the ground can be identified in the correlation sequence. Having a way to reliably detect a contact patch feature within measured data from a tire mounted sensor enables to implement robust synchronization and tire auto-location mechanisms. Methods and devices according to embodiments of the present invention allow to extract properties of the rolling wheel such as the perturbation width and/or depth at low cost (in terms of power and memory).

The pseudo-code below illustrates how properties of a rolling wheel may be determined in accordance with an exemplary method of the present invention. In this example the duration of the perturbation (t_patch) and the amplitude of the perturbation (a_patch) are determined.

Input: s[k]=signed-step cross-correlation signal

```
If k > 2N Then
  i.   If s[k] > falling edge detection threshold Then
       1. //Falling edge of the acceleration signal detected
       2. //Wait for maximum in the signed-step cross-correlation signal
       3. If maximum(s[k]) reached Then
          a. s_max =[s[k] //Store value of max(s[k])
          b. k_smax = k //Store value of k @ s_max
       4. EndIf
       5. If s[k] < rising edge detection threshold Then
          a. //Rising edge detected
          b. //Consider that patch has been detected
          c. patch_detected = true
          d. //Wait for minimum
          e. If minimum(s[k]) reached Then
             i.   s_min = s[k] //Store value of min(s[k])
             ii.  k_smin = k //Store value of k@ s_min
             iii. t_patch = k_smin - k_smax
             iv.  a_patch = (s_max - s_min)
          f. EndIf
       6. EndIf
  ii.  EndIf
EndIf
```

In embodiments of the present invention the detection system is adapted for obtaining an estimation of the load from the correlation sequence. As illustrated in FIG. 12 the perturbation width can be used as a measure for the load. The perturbation may for example be a perturbation in the correlation sequence of data samples from a tangential acceleration sensor or from a radial acceleration sensor, or a combination of both. The width of the perturbation may be combined with the amplitude of the perturbation to improve (fine tune) the load measurement. Besides the perturbation characteristics, also other parameters such as temperature and pressure and the time between two perturbations, may be used to determine the load.

The load applied to a tire can be estimated by knowing the width and/or depth of the perturbation in the correlation sequence. The relation between the width and/or depth of the perturbation in the correlation sequence and the load may for example be determined by calibration. This may for example be done for different tire rolling speeds, tire pressure inflations, and tire types.

It is advantageous to have an estimate on the load imposed by a vehicle on the wheel as this can be used for improving the safety of the vehicle.

In embodiments of the present invention an acceleration sensor may be used to measure the load applied to the wheel. The sensor is mounted in the tire on the inner liner. With the signal from the accelerometer during the contact patch the time between the leading and trailing edge of the contact patch can be extracted. This duration corresponds to the angle or the length of contact patch. In embodiments of the present invention this duration may be obtained by obtaining the duration of a perturbation in the correlation sequence.

A detection system in accordance with embodiments of the present invention may comprise a pressure sensor adapted for measuring the pressure inside the tire in which it is mounted.

A detection system in accordance with embodiments of the present invention may be adapted for obtaining the tire rolling speed by identifying two consecutive perturbations in the correlation sequence and by measuring the period between the consecutive correlation sequences.

In embodiments of the present invention at least one sensor may be a MEMS accelerometer. The MEMS accelerometer may be mounted such that the tangential component of the acceleration is parallel to the accelerometer substrate.

As discussed before the tangential component of the acceleration or the normal component of the acceleration or a combination of both may be measured.

Figure 14:
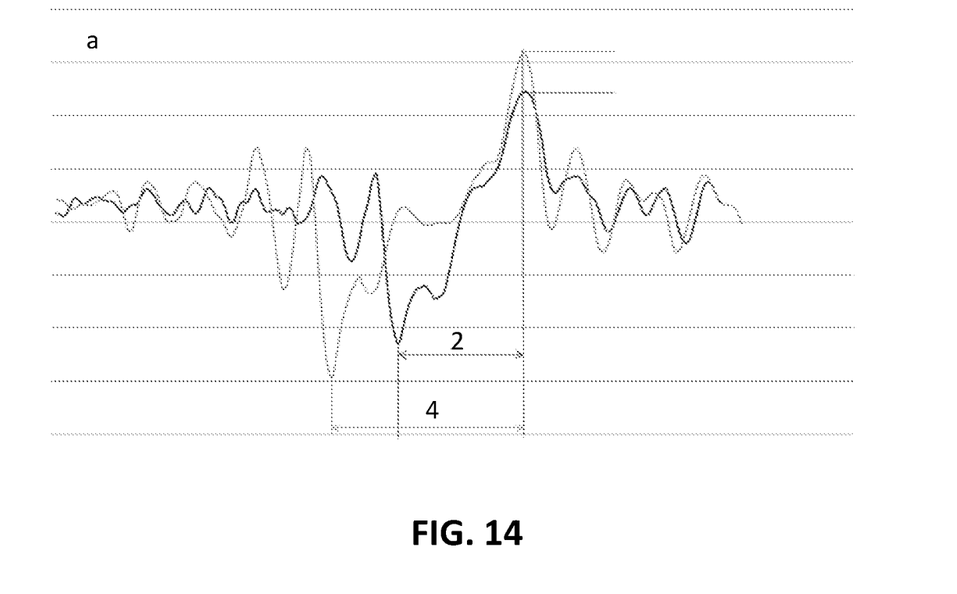
FIG. 14 shows traces of data samples of a sensor adapted for measuring the tangential component of the acceleration, wherein each trace corresponds with a different load on the wheel.

In embodiments of the present invention the sensor may be a MEMS sensor adapted for measuring the tangential component of the acceleration. The output signal of such a tangential sensor is shown in FIG. 14 and in the top graph of FIG. 7. The width of the perturbation of curve 4 is greater than the width of the perturbation of curve 2. For a same speed this difference in width is caused by a difference in load which is higher for the load of curve 4 than for the load for curve 2. The width of the perturbation in the sequence of data samples may, hence, be used as an indirect measure of the load. In some embodiments, the sensed acceleration (radial or tangential) is parallel to the in-plane direction of the MEMS accelerometer substrate. It is advantageous that the sensitivity and the linearity of the accelerometer is higher in the in-plane direction of the substrate, which yields an improved load measurement capability as compared to solutions where the measured acceleration component is not in the in-plane direction of the substrate. It is advantageous that the time patch duration can be determined by detecting the minimum and the maximum of the signal (see FIG. 14). As illustrated in FIG. 7, it is even more advantageous to obtain the width of a perturbation in the correlation sequence, as this perturbation is less noisy and has no offset. Also in this case the width and/or the depth of the perturbation may be used to estimate the load.

Figure 13:
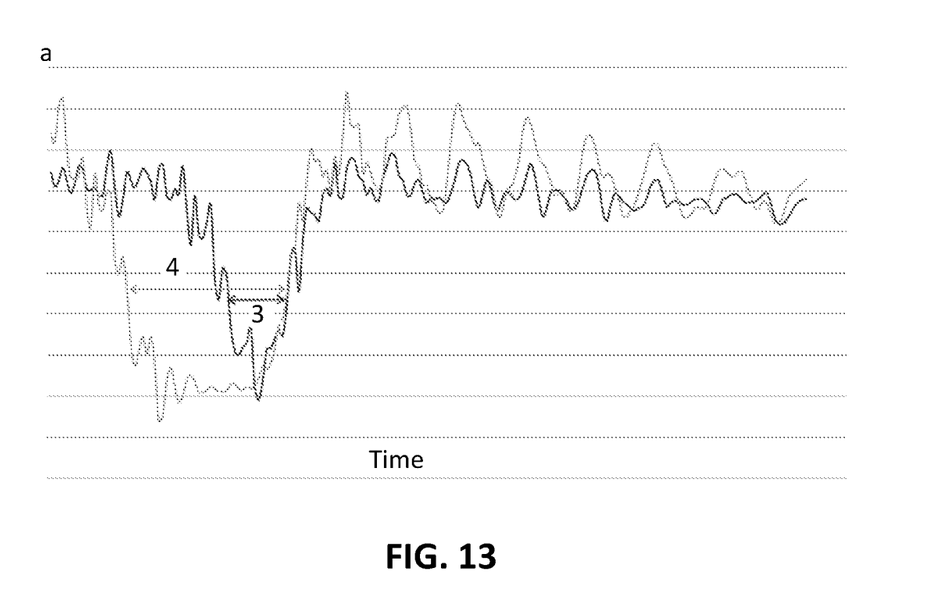
FIG. 13 shows traces of data samples of a sensor adapted for measuring the normal component of the acceleration, wherein each trace corresponds with a different load on the wheel.

In embodiments of the present invention the sensor module may comprise a sensor adapted for sensing the normal component (along the z-axis) of the acceleration. FIG. 13 for example shows two traces of data samples for different loads on the tires in which the sensor module is mounted. The width of curve 3 is smaller than the width of curve 4. For the latter curve the load was higher than for the former one. The width may be determined directly on the data samples, but more preferably, the perturbation width and perturbation amplitude are determined from a correlation sequence (see FIG. 6) which is obtained using an acquisition module in accordance with embodiments of the present invention.

The invention claimed is:

1. A detection system for extracting information from a sensor module in a rolling wheel, the detection system comprising:
   a sensor module which comprises a sensor adapted for sensing a physical property of the tire when mounted in a tire of the wheel or on an inner surface of a tire of the wheel;
   an acquisition module adapted for sampling a signal from the sensor module, thus obtaining a sequence of data samples;
   a correlation module adapted for cross-correlating a signed reference sequence, which comprises a first sequence of data with a first sign and a second sequence of data with a second sign opposite to the first sign, with the sequence of data samples thus obtaining a correlation sequence; and
   an extraction module adapted for identifying at least one perturbation in the correlation sequence, wherein the perturbation is induced when a part of the tire where the sensor is mounted hits the ground thereby forming the tire patch.

2. The detection system according to claim 1, wherein the extraction module is moreover adapted for obtaining at least one property of the rolling wheel from the at least one perturbation.

3. The detection system according to claim 1, wherein the signed reference sequence is a finite reference sequence of length 2N, wherein N is a natural number greater than 0.

4. The detection system according to claim 3, wherein the correlation module is adapted for dynamically adjusting the length of the signed reference sequence.

5. The detection system according to claim 3, wherein the correlation module is adapted for normalizing the correlation sequence by dividing the elements thereof with an integer multiple of N.

6. The detection system according to claim 1, wherein the one or more perturbations in the correlation sequence are identified by comparing the correlation sequence with a characterizing feature of the perturbation.

7. The detection system according to claim 6, wherein at least one predefined threshold is used as characterizing feature.

8. The detection system according to claim 1, wherein at least one property of the rolling wheel is the number of samples in the one or more perturbations.

9. The detection system according to claim 1, wherein at least one property of the rolling wheel is the amplitude of the one or more perturbations.

10. The detection system according to claim 1, wherein at least one property of the rolling wheel is the duration of the one or more perturbations.

11. The detection system according to claim 1, the detection system moreover comprising a communication module adapted for transmitting the one or more perturbations or a processed version thereof.

12. The detection system according to claim 11, the communication module comprising a wireless communication module.

13. The detection system according to claim 1, wherein the sensor is an acceleration sensor.

14. The detection system according to claim 1, wherein the extraction module is adapted for obtaining a measure for a load on the rolling wheel.

15. A method for extracting information from a sensor module in a rolling wheel, the method comprising:
   sensing a physical property of the tire when mounted in a tire of the wheel or on an inner surface of a tire;
   sampling a signal from the sensor module, thus obtaining a sequence of data samples;
   cross-correlating a signed reference sequence, which comprises a first sequence of data with a first sign and a second sequence of data with a second sign opposite to the first sign, with the sequence of data samples thus obtaining a correlation sequence; and
   identifying at least one perturbation in the correlation sequence, wherein the perturbation is induced when a part of the tire where the sensor is mounted hits the ground thereby forming a tire patch.

16. A detection system for extracting information from a sensor module in a rolling wheel, the detection system comprising:
   a sensor module which comprises at least one sensor adapted for sensing a physical property of the tire when mounted in a tire of the wheel or on an inner surface of a tire of the wheel;

an acquisition module adapted for sampling a signal from the sensor module, thus obtaining a sequence of data samples;

a correlation module adapted for cross-correlating a signed reference sequence, which comprises a first sequence of data with a first sign and a second sequence of data with a second sign opposite to the first sign, with the sequence of data samples thus obtaining a correlation sequence; and an extraction module adapted for identifying at least one perturbation in the correlation sequence, wherein the perturbation is induced when a part of the tire where the sensor is mounted hits the ground thereby forming the tire patch;

wherein the detection system is implemented centrally in a single packaged device.

17. The detection system according to claim 16, wherein the signed reference sequence comprises a signed step function.

18. The detection system according to claim 16, wherein the at least one sensor comprises a combination of at least two sensors.

19. The detection system according to claim 16, wherein a signal offset, which is present in the sequence of data samples, is not present in the correlation sequence.

* * * * *